United States Patent [19]
Hawk et al.

[11] Patent Number: 5,723,043
[45] Date of Patent: Mar. 3, 1998

[54] FILTERING APPARATUS HAVING POSITIVELY BUOYANT AND NEGATIVELY BUOYANT PARTICULATE

[76] Inventors: William D. Hawk, 7417 Aurelia Rd., Oklahoma City, Okla. 73121; Gary D. Cryer, 316 E. 15th, Chandler, Okla. 74834

[21] Appl. No.: 663,561

[22] Filed: Jun. 13, 1996

[51] Int. Cl.[6] .............................. A01K 63/04; C02F 3/06
[52] U.S. Cl. ........................... 210/108; 210/138; 210/169; 210/275; 210/290; 210/416.2
[58] Field of Search .................................. 210/108, 138, 210/169, 275, 283, 290, 416.2

[56] References Cited

U.S. PATENT DOCUMENTS

| | | | |
|---|---|---|---|
| 1,737,202 | 11/1929 | Runnels | 210/290 |
| 3,471,025 | 10/1969 | Dobson | 210/290 |
| 3,616,915 | 11/1971 | Whitlock | 210/108 |
| 3,814,245 | 6/1974 | Hirs | 210/290 |
| 3,814,247 | 6/1974 | Hirs | 210/290 |
| 3,956,128 | 5/1976 | Turner | 210/290 |
| 4,246,119 | 1/1981 | Alldredge | 210/290 |
| 4,322,296 | 3/1982 | Fan et al. | 210/610 |
| 4,519,917 | 5/1985 | Martinola | 210/290 |
| 4,806,236 | 2/1989 | McCormack | 210/290 |
| 5,453,183 | 9/1995 | Hoffa | 210/169 |

*Primary Examiner*—Stanley S. Silverman
*Assistant Examiner*—Theodore M. Green
*Attorney, Agent, or Firm*—Dunlap & Codding, P.C.

[57] ABSTRACT

A filtration system having a volume of positively buoyant particulate material and a volume of negatively buoyant particulate material. The system includes a vessel having an upper port, a lower port and an intermediate drain port. As contaminated liquid travels between the upper and lower ports, it is filtered through both volumes of particulate material. The system may be operated with the liquid flowing in either direction between the upper and lower ports. To clean the system, the drain port is opened and cleaning liquid is pumped into the upper port and/or the lower port and flushed out the drain port. An alternate embodiment of the filtration system includes a vessel, two tubular members, a volume of positively buoyant particulate and a volume of negatively buoyant material. The two tubular members extend into the vessel and have slotted areas for travel of liquid into and out of the tubular members. A check valve, a motorized slide valve and a backwash controller are provided to automatically reverse flow through the vessel.

20 Claims, 4 Drawing Sheets

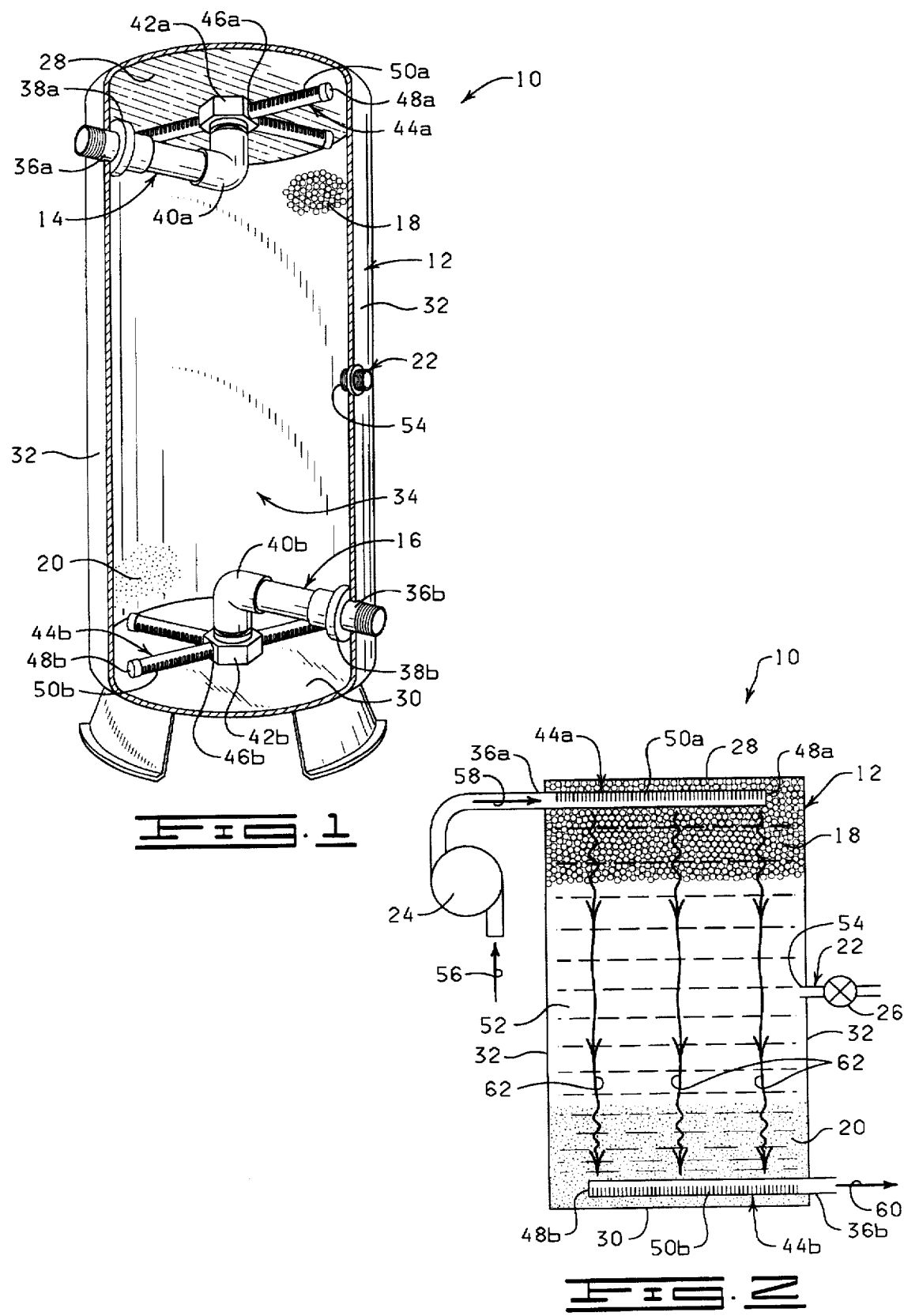

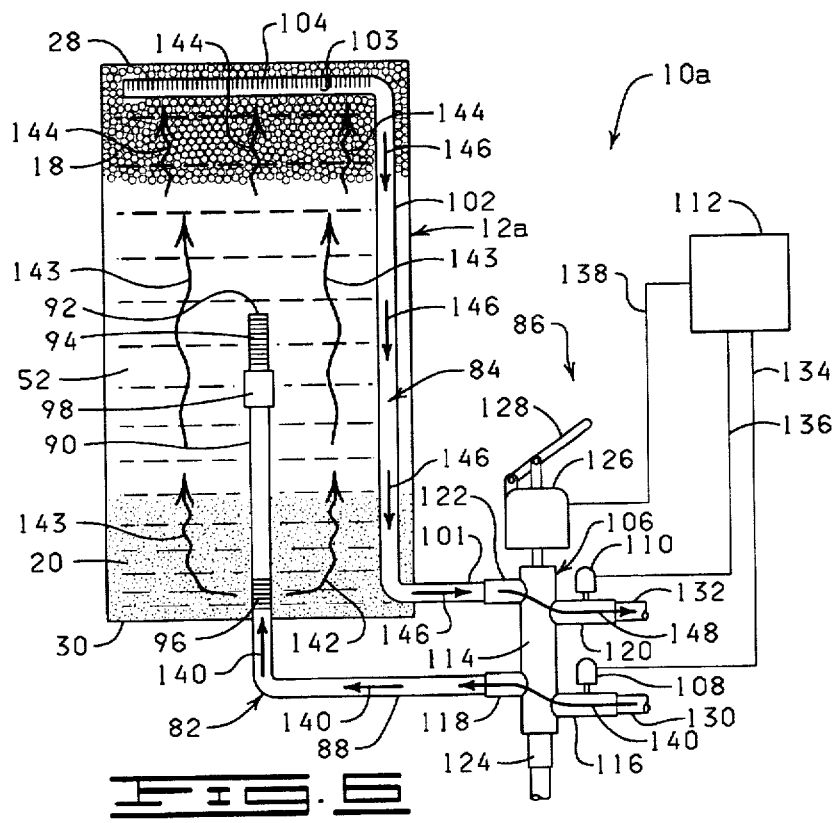
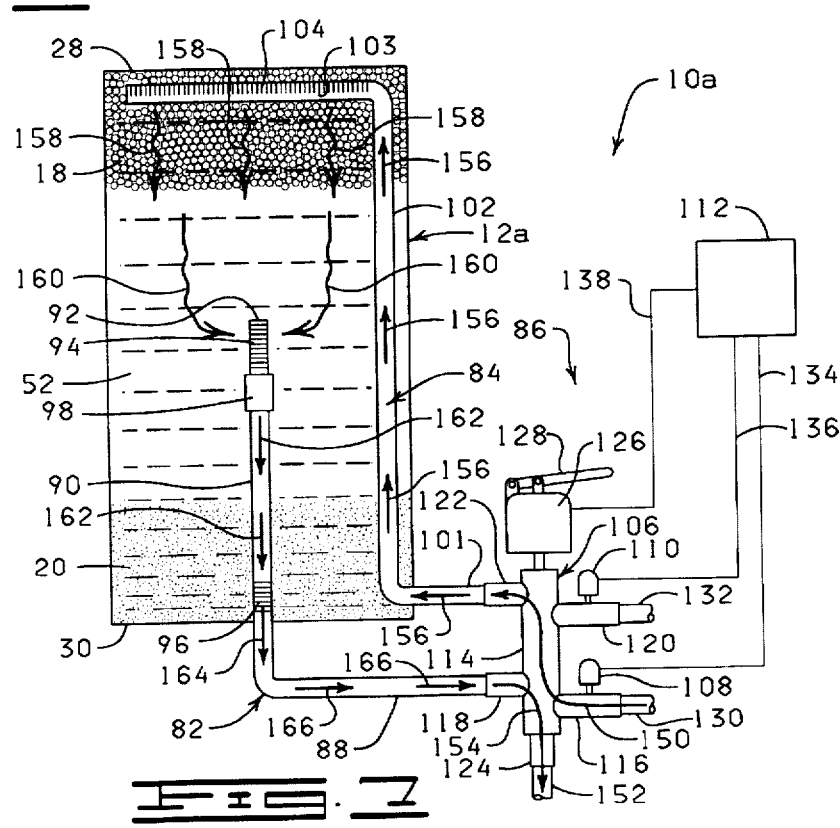

5,723,043

1

FILTERING APPARATUS HAVING POSITIVELY BUOYANT AND NEGATIVELY BUOYANT PARTICULATE

BACKGROUND OF THE INVENTION

1. Field of the Invention

The present invention relates generally to filtering systems and more particularly, but not by way of limitation, to a filtration system for fish tanks, aquariums, ponds, fountains, water treatment facilities, water purification devices and the like.

2. Description of Related Art

Many types of fluidized beds are known in the art. For example, U.S. Pat. No. 4,322,296 discloses a method for waste water treatment in a vessel having a fixed perforated plate and a movable perforated plate. A particulate carrier having a specific gravity greater than water is employed as the filtering medium within the vessel.

As a further example, U.S. Pat. No. 5,453,183 discloses a fluidized bed biological filter system for fish tanks. This system utilizes glass beads having a specific gravity greater than 1.5 times that of water as particulate media.

In these filtration systems, contaminated water is passed through a negatively buoyant particulate medium. Thus, these systems only accomplish one type of filtration, i.e. filtration through a particulate carrier having a specific gravity greater than water.

SUMMARY OF THE INVENTION

A filtration system constructed in accordance with the present invention performs two types of filtration: (1) through a positively buoyant material, and (2) through a negatively buoyant material. The system includes a vessel, means for introducing contaminated liquid into the vessel, means for discharging filtered liquid out of the vessel, a volume of positively buoyant particulate disposed in the vessel and a volume of negatively buoyant particulate also disposed in the vessel.

One object of the present invention is to provide a filtration system which filters liquid through positively and negatively buoyant beds of particulate material.

A second object of the present invention is to provide a filtration system which is capable of filtering liquid flowing in either direction through the system.

A third object of the present invention is to provide a filtration system which is easily cleaned.

A fourth object of the present invention is to remove fine particulate contaminants suspended in the liquid to be filtered.

A fifth object of the present invention is to remove ammonia and nitrites dissolved in the liquid to be filtered through biological action of bacteria growing on the surface of the particulate filter media.

A sixth object of the present invention is to promote growth of bacteria to enhance biological filtration of the liquid to be filtered.

Other objects, features and advantages of the present invention are apparent from the following detailed description when read in conjunction with the accompanying drawings and appended claims.

BRIEF DESCRIPTION OF THE DRAWINGS

FIG. 1 is a partly diagrammatical perspective view of a filtering apparatus constructed in accordance with the present invention. A portion of the vessel is cut away to expose the interior of the vessel.

FIG. 2 is a diagrammatical view of the filtering apparatus wherein unfiltered liquid is introduced into an upper area of the vessel and filtered liquid is discharged from a lower area of the vessel.

FIG. 6 is the same view as FIG. 5, but including direction arrows illustrating the normal filtering mode of the filtering apparatus.

FIG. 7 is the same view as FIG. 5, but including direction arrows illustrating the backwash mode of the filtering apparatus.

DETAILED DESCRIPTION OF THE PREFERRED EMBODIMENTS

Figure 3:
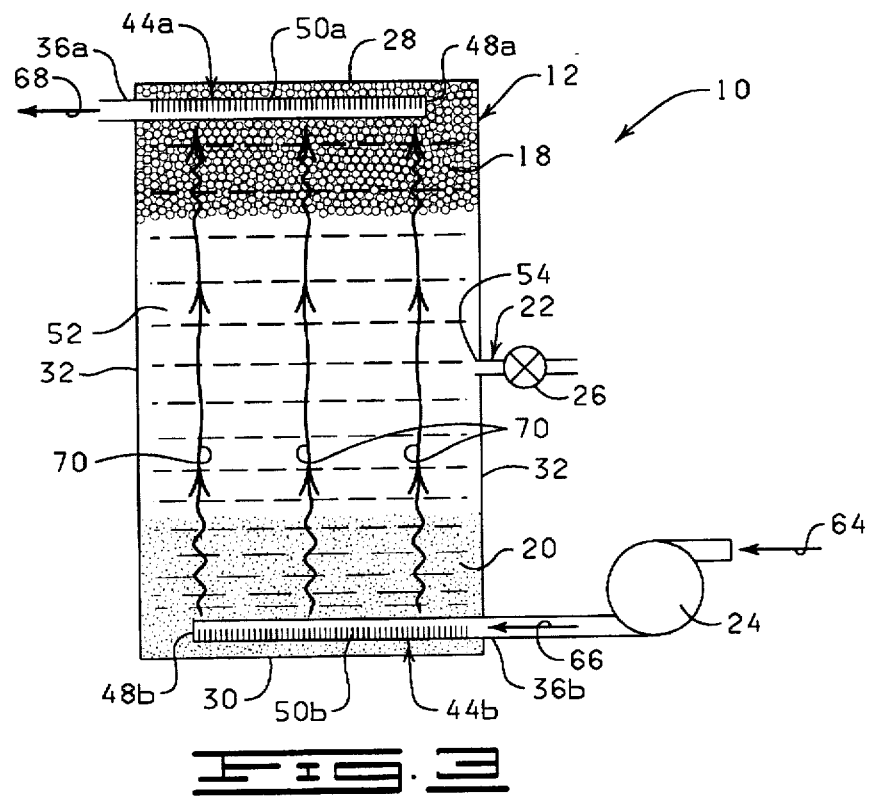
FIG. 3 is a diagrammatical view of the filtering apparatus wherein unfiltered liquid is introduced into a lower area of the vessel and filtered liquid is discharged from an upper area of the vessel.

Referring to the drawings in general, and to FIG. 1 in particular, shown therein and designated by the general reference numeral 10 is a filtering apparatus, which includes a vessel 12, an upper port assembly 14, a lower port assembly 16, a volume of positively buoyant ("floating") particulate 18, a volume of negatively buoyant ("sinking") particulate 20, and a drain port assembly 22. As shown in FIGS. 2 and 3, the filtering apparatus 10 typically includes a pump 24, for urging liquid through the vessel 12, and a drain plug or drain valve 26, for opening and closing the drain port assembly 22.

As illustrated in FIG. 1, the vessel 12 has an upper end 28, a lower end 30 and substantially cylindrical tubular side walls 32 to define an interior chamber 34. However, the vessel 12 may be any conventional receptacle capable of containing liquid in a substantially fluid-tight manner. Thus, the vessel 12 may be constructed in numerous shapes and from a great number of suitable materials.

Further, the vessel 12 may be constructed in a wide variety of sizes to cover a broad range of liquid capacities. For example, the vessel 12 may be quite small when adapted for use in a one- or two-gallon aquarium, but may be relatively large when utilized in a half-acre ornamental pond.

The upper port assembly 14 includes an upper pipe 36a, an upper washer bushing 38a, an upper elbow 40a, an upper adapter 42a and a plurality of upper slotted tubes 44a. The upper pipe 36a extends through the side wall 32 of the vessel 12 and is connected to the upper elbow 40a.

The upper elbow 40a is connected to the upper adapter 42a and, in turn, the upper slotted tubes 44a are mounted to the upper adapter 42a. It should be appreciated that the upper adapter 42a is constructed such that the interiors of the upper slotted tubes 44a are in fluid communication with the upper elbow 40a through the upper adapter 42a. Thus, the upper port assembly 14 provides fluid communication from outside the vessel 12 through the upper pipe 36a, the upper elbow 40a, the upper adapter 42a and the upper slotted tubes 44a to the interior of the vessel 12 at an upper area of the vessel 12.

The upper washer bushing 38a provides a fluid-tight seal between the upper pipe 36a and the side wall 32 of the vessel 12. It should be understood that any suitable sealing mechanism known in the art may be utilized in place of the upper washer bushing 38a to prevent leakage of fluid from the vessel 12 around the upper pipe 36a.

Each one of the upper slotted tubes 44a extends from the upper adapter 42a in any suitable manner. Further, each upper slotted tube has an inner end 46a connected to the upper adapter 42a and an outer end 48a, which is closed.

Between the inner end 46a and the outer end 48a, each upper slotted tube 44a has a plurality of slots. One of the slots is designated by reference character 50a and is generally representative of the slots in the upper slotted tubes 44a.

The lower port assembly 16 has the same components as the upper port assembly 14. In the drawing figures, like numerals designate like components and an appended letter indicates the upper or lower port assembly 14 or 16 (appended letter "a" denotes "upper" and appended letter "b" denotes "lower").

It should be appreciated that the slots 50a of each upper slotted tube 44a extend partially around the tube 44a and are disposed generally toward the interior wall of the upper end 28 of the vessel 12. In similar fashion, the slots 50b of each lower slotted tube 44b extend partially around the tube 44b and are disposed generally toward the interior wall of the lower end 30 of the vessel 12.

The floating particulate 18 contained in the vessel 12 may comprise a wide variety of materials. Positively buoyant polymeric beads are a preferred floating particulate. The beads may be solid, porous, hollow, air-filled, vacuum-filled, gas-filled, or any other bead which is positively buoyant in the liquid to be filtered.

The size and shape of the floating particulate 18 may be varied greatly as long as the floating particulate 18 defines a medium which is porous to a liquid 52 disposed in the vessel 12. However, the floating particulate 18 should have dimensions such that it will neither pass through nor clog the slots 50a in the upper slotted tubes 44a.

Typically, the quantity of floating particulate 18 utilized is adequate to provide an aggregation of positively buoyant particulate 18 for the upper ten to thirty percent of the vessel 12. Of course, the amount of floating particulate 18 used may be increased or decreased depending on the type of liquid 52 being filtered and the desired filtering results.

The sinking particulate 20 contained in the vessel 12 may comprise a wide variety of negatively buoyant materials. Sand and gravel are preferred materials for the sinking particulate 20. Other materials which may be used for the sinking particulate 20 include crushed rock, granules of charcoal or the like, stainless steel balls, stainless steel beads, metallic balls, metallic beads, glass beads, plastic beads, filled polymeric beads, glass balls, metallic balls coated with a polymeric material, metallic beads coated with a polymeric material, and polymeric beads filled with a suitable material such as calcium.

The size and shape of the sinking particulate 20 may be varied greatly as long as the sinking particulate 20 defines a medium which is porous to the liquid 52 being filtered. However, the sinking particulate 20 should have dimensions such that it will neither pass through nor clog the slots 50b in the lower slotted tubes 44b.

Typically, the quantity of sinking particulate 20 is adequate to provide a medium of porous material extending over the lower ten to thirty percent of the vessel 12. However, the amount of sinking particulate 20 used may be increased or decreased depending on the type of liquid 52 being filtered and the desired filtering results.

The dimensions and quantities of floating particulate 18 and sinking particulate 20 affect the filtering efficiency and the throughput of the filtering apparatus 10. In general, small volumes of coarse particulate 18 and 20 result in greater throughput but with fewer impurities removed from the liquid 52.

Conversely, large quantities of fine particulate 18 and 20 produce better filtration but reduced throughput or increased pumping requirements to push the liquid 52 through the filtering apparatus 10. Thus, the sizes and quantities of floating and sinking particulate 18 and 20 should be selected according to the filtration characteristics desired.

The drain port assembly 22 is provided for use in cleaning the filtering apparatus 10. As shown in FIG. 1, the drain port assembly 22 includes a drain pipe 54 which extends through the side wall 32 of the vessel 12. As previously disclosed herein, the drain port assembly 22 also comprises the drain plug or drain valve 26 connected to the drain pipe 54 to close off the drain pipe 54 during operation of the filtering apparatus 10 and to open the drain pipe 54 during cleaning of the filtering apparatus 10.

DOWNWARD FLOW OPERATION

With reference to FIG. 2, shown therein is the filtering apparatus 10 in downward flow operation. The pump 24 forces unfiltered liquid into an upper area of the vessel 12 (direction arrows 56 and 58) and filtered liquid exits at a lower part of the vessel 12 (direction arrow 60).

The unfiltered liquid enters the vessel 12 through the slots 50a of the upper slotted tubes 44a. Due to its buoyancy, the floating particulate 18 is amassed throughout an upper portion of the vessel 12.

The downward flow of the liquid 52 opposes the movement of the positively buoyant particulate 18, which has a strong bias for floating in the liquid 52. The opposing forces of the liquid flow and the particulate buoyancy produce a fluidized bed type of action, which may create a floc (not shown) below the aggregation of the positively buoyant particulate 18.

After traveling through the buoyant particulate 18, the liquid 52 continues downward to the negatively buoyant particulate 20 (direction lines 62). Here, the tendency of the negatively buoyant particulate 20 to sink acts in concert with the flow of the liquid 52. Thus, the negatively buoyant particulate 20 acts as a straining medium.

After being strained through the negatively buoyant particulate 20, filtered liquid 52 enters the lower port assembly 16 through the slots 50b of the lower slotted tubes 44b and is discharged from the vessel 12 through the lower pipe 36b as indicated by direction arrow 60. Of course, the drain valve 26 is closed during downward flow operation of the filtering apparatus 10.

It should be appreciated that two types of filtering operations are performed by the filtering apparatus 10 in the mode of downward flow filtration. A fluidized bed type of filtration takes place in an upper portion of the vessel 12 and a straining bed type of filtration occurs in a lower portion of the vessel 12.

Typically, the pump 24 or any like device is provided to force the liquid through the filtering apparatus 10 under fluid pressure. However, it is within the scope and concept of the present invention to utilize the filtering apparatus 10 without the pump 24 in a downward flow system wherein the liquid 52 is gravity fed through the filtering apparatus 10.

UPWARD FLOW OPERATION

Referring to FIG. 3, shown therein is the filtering apparatus 10 in upward flow operation. The pump 24 forces unfiltered liquid into a lower area of the vessel 12 (direction arrows 64 and 66) and filtered liquid exits at an upper part of the vessel 12 (direction arrow 68).

The unfiltered liquid enters the vessel 12 through the slots 50b of the lower slotted tubes 44b. Due to its sinking characteristic, the negatively buoyant particulate 20 is amassed throughout a lower portion of the vessel 12.

The upward flow of the liquid 52 opposes the movement of the negatively buoyant particulate 20, which has a bias for sinking in the liquid 52. The opposing forces of the liquid flow and the sinking of the negatively buoyant particulate 20 produce a fluidized bed type of action, which may create a floc (not shown) above the aggregation of the negatively buoyant particulate 20.

After traveling through the negatively buoyant particulate 20, the liquid 52 continues upward to the positively buoyant particulate 18 (direction lines 70). Here, the tendency of the positively buoyant particulate 18 to float acts in concert with the flow of the liquid 52. Thus, the positively buoyant particulate 18 acts as a straining medium with respect to the liquid 52.

After being strained through the positively buoyant particulate 18, filtered liquid 52 enters the upper port assembly 14 through the slots 50a of the upper slotted tubes 44a and is discharged from the vessel 12 through the upper pipe 36a as indicated by direction arrow 68. Of course, the drain valve 26 is closed during upward flow operation of the filtering apparatus 10.

It should be appreciated that two types of filtering operations are performed by the filtering apparatus 10 in the mode of upward flow filtration. A fluidized bed type of filtration takes place in a lower portion of the vessel 12 and a straining bed type of filtration occurs in an upper portion of the vessel 12.

CLEANING THE FILTERING APPARATUS

Figure 4:
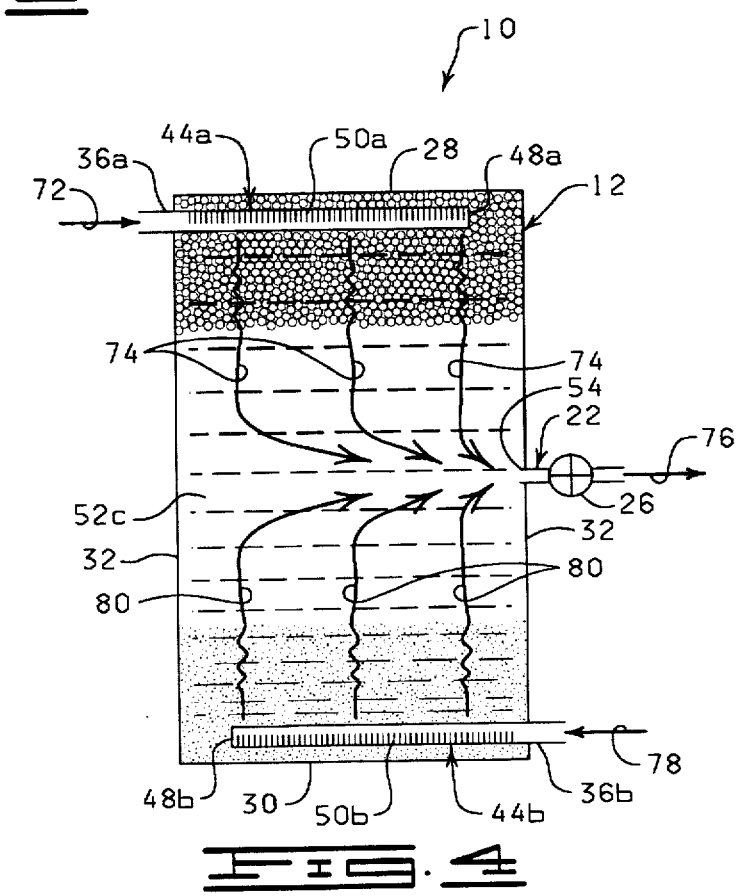
FIG. 4 is a diagrammatical view of the filtering apparatus being back-flushed to remove debris from the vessel.

With reference to FIG. 4, shown therein is the filtering apparatus 10 in a cleaning mode. Basically, the filtering apparatus 10 is cleaned by back-flushing liquid through the positively buoyant particulate 18 and/or the negatively buoyant particulate 20.

It should be appreciated that the particulate 18 or 20 which acts as a straining medium traps most of the debris and contaminants during the filtration process and should be cleaned periodically. However, either or both particulates 18 and 20 may be back-flushed from time to time as dictated by the amount of impurities in the liquid to be filtered.

Back-flushing the positively buoyant particulate 18 is performed by opening the drain valve 26 and forcing cleaning liquid 52c into the upper port assembly 14 as indicated by direction arrow 72. The cleaning liquid 52c enters the vessel 12 through the slots 50a of the upper slotted tubes 44a, passes through the positively buoyant particulate 18, and travels within the vessel 12 as indicated by direction lines 74.

Eventually, the cleaning liquid 52c enters the drain port assembly 22 and passes through the drain valve 26, as indicated by direction arrow 76. After its exit from the vessel 12, the cleaning liquid 52c, carrying debris and impurities flushed from the positively buoyant particulate 18, is collected for appropriate disposal.

It should be appreciated that the filtering apparatus 10 may be provided with any conventional arrangement of valves, fittings, bushings, connections, vessels, containers, washers, filters, screens and the like for handling the cleaning liquid and debris and for converting between the filtering mode and the cleaning mode. Further, the cleaning liquid 52c may be water or may be any solution of cleaning fluids known in the art and suitable for the purpose disclosed herein.

Back-flushing the negatively buoyant particulate 20 is performed by opening the drain valve 26 and forcing cleaning liquid into the lower port assembly 16 as indicated by direction arrow 78. The cleaning liquid 52c enters the vessel 12 through the slots 50b of the lower slotted tubes 44b, passes through the negatively buoyant particulate 20, and travels within the vessel 12 as indicated by direction lines 80.

Eventually, the cleaning liquid 52c enters the drain pipe 54 and passes through the drain valve 26, as indicated by direction arrow 76. After its exit from the vessel 12, the cleaning liquid 52c, carrying debris and impurities flushed from the negatively buoyant particulate 20, is collected for appropriate disposal.

EMBODIMENT OF FIGS. 5 THROUGH 7

Figure 5:
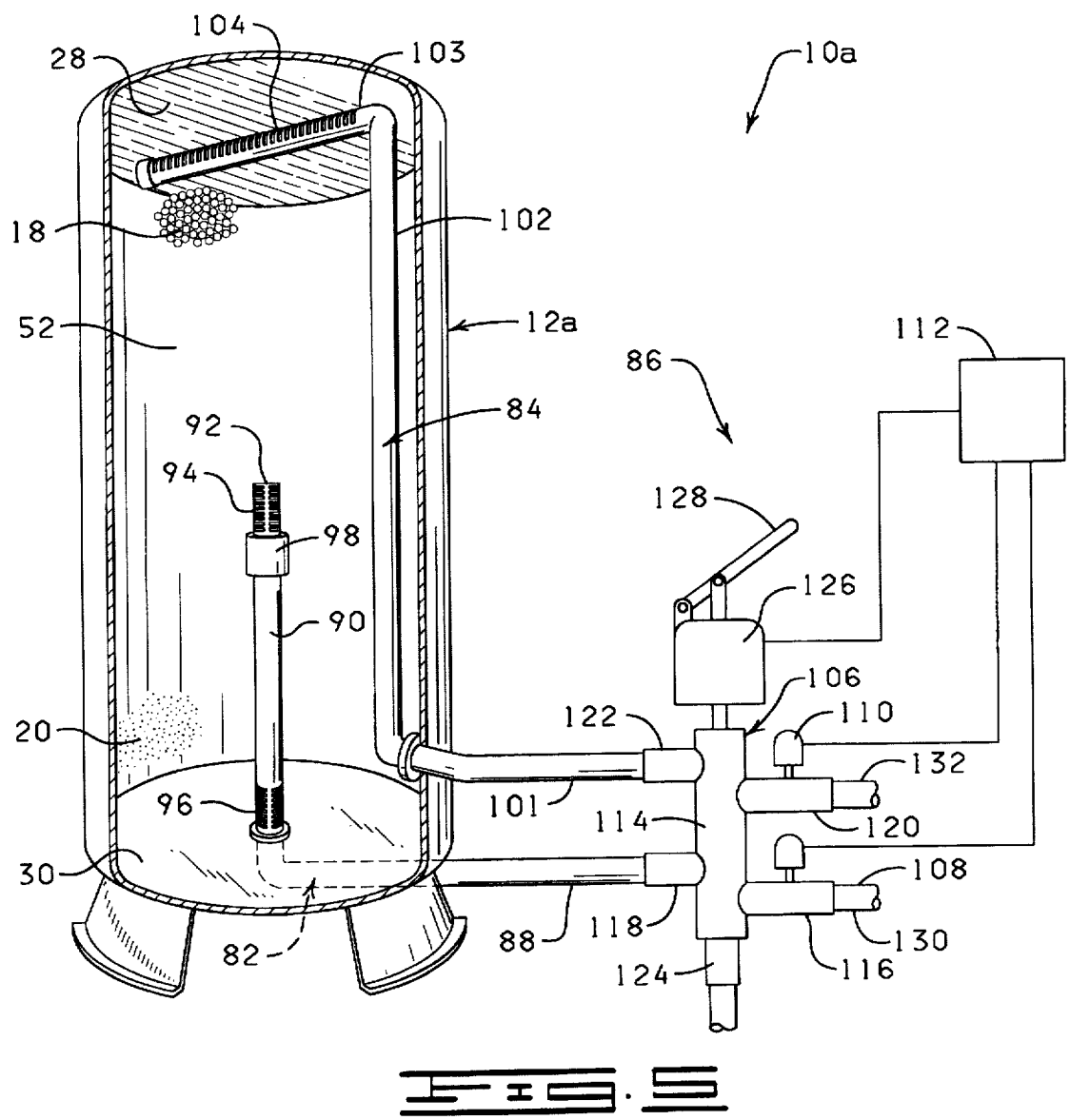
FIG. 5 is a diagrammatical view of another embodiment of a filtering apparatus constructed in accordance with the present invention.

With reference to FIGS. 5 through 7, shown therein and designated by reference character 10a is an alternate embodiment of the filtering apparatus 10. The filtering apparatus 10a includes a vessel 12a, positively buoyant particulate 18, negatively buoyant particulate 20, a first pipe 82, a second pipe 84, and a backwash control system 86.

The vessel 12a is very similar to the vessel 10 disclosed hereinabove. Tanks which are suitable for use as the vessel 12a include the Nautilus FNS fiberglass DE product and the Nautilus stainless steel DE unit available from Purex Triton Swimming Pool Systems.

The first pipe 82 has a first leg 88 in fluid communication with the backwash control system 86 and a second leg 90 extending into the interior of the vessel 12a. The second leg 90 has a slotted or closed end 92 which is positioned between the floating particulate 18 and the sinking particulate 20 in the interior of the vessel 12a.

Further, the first pipe 82 has two slotted areas. A first slotted area 94 is at the end 92 of the first pipe 82 and a second slotted area 96 is positioned in the sinking particulate 20 toward the lower end 30 of the vessel 12a.

The first pipe 82 is provided with a swing check valve 98, which is installed between the first slotted area 94 and the second slotted area 96. The swing check valve 98 may be located at any point between the first slotted area 94 and the second slotted area 96. However, the swing check valve 98 is preferably positioned proximate to the first slotted area 94. The swing check valve 98 is closed when fluid flow is in the direction from the first leg 88 toward the second leg 90 and is open when fluid flow is from the end 92 of the first leg 88 toward the swing check valve 98.

The second pipe 84 has a first leg 101, a second leg 102 and a third leg 103. The first leg 101 is in fluid communication with the backwash control system 86. The second leg 102 extends from the first leg 101 and is a riser within the vessel 12a.

The third leg 103 of the second pipe 84 extends from the second leg 102 and is positioned in an upper area of the floating particulate 18 within the vessel 12a. The third leg 103 is provided with at least one slotted area 104.

The backwash control system 86 includes a motorized slide valve 106, a pair of pressure sensors 108 and 110, and a backwash controller 112. The slide valve 106 has a valve body 114, a first port 116, a second port 118, a third port 120, a fourth port 122, a drain port 124, a motorized valve actuator 126, and a manually-operated valve lever 128.

As best seen in FIG. 6, the first port 116 of the slide valve 106 is connected to an intake line 130 and the second port 118 is connected to the first leg 88 of the first pipe 82. Under normal filtering operation, the slide valve 106 allows fluid flow from the first port 116 to the second port 118 and into the vessel 12a via the first pipe 82.

The third port 120 of the slide valve 106 is connected to a discharge line 132 and the fourth port 122 is connected to the first leg 101 of the second pipe 84. Under normal filtering operation, the slide valve 106 allows fluid flow out of the vessel 12a through the second pipe 84, into the slide valve 106 through the fourth port 122, and out of the third port 120 into the discharge line 132.

One of the pressure sensors 108 is installed on the intake fluid pressure and the other pressure sensor 110 is located to provide an indication of the discharge fluid pressure. It should be appreciated that the pressure sensor 108 may be positioned at the intake line 130, the first port 116, the second port 118, the first pipe 82, or within the valve body 114 of the slide valve 106.

Similarly, the pressure sensor 110 may be located at the discharge line 132, the third port 120, the fourth port 122, the second pipe 84, or the within the valve body 114 of the slide valve 106. As indicated by the control lines 134 and 136, the pressure sensors 108 and 110 are operatively connected to the backwash controller 112.

A suitable slide valve 106 is commercially available as a 2-inch PVC slide valve kit, product number 26-1165, from Purex Triton Swimming Pool Systems. However, this particular slide valve is designed for use with sand filters and should be modified so that the flows for normal filtering operation and backwash mode are switched.

Further, an assembly for the slide valve 106, the automatic backwash controller 112 and the pressure sensors 108 and 110 is commercially available from Purex Triton Swimming Pool Systems under the product number 26-1063. Again, modification to flip-flop the normal flow and backwash flow through the commercially available slide valve is required.

The backwash controller 112 comprises an appropriate control panel, circuitry, and electrical and mechanical components for switching the slide valve 106 between normal filtering mode and backwash mode. Typically, the backwash controller 112 includes logic to switch from normal filtering mode to backwash mode in response to a preset pressure rise differential of the two pressure sensors 108 and 110.

Alternatively, the backwash controller 112 may include a timer device such that the slide valve 106 may be switched from normal filtering mode to backwash mode at preselected time intervals. Further, the backwash controller 112 typically has a manual mode wherein an operator may switch the slide valve 106 by hand between normal filtering mode and backwash mode by manually actuating the valve lever 128.

It should be appreciated that the filtering apparatus 10a includes floating particulate 18 and sinking particulate 20 as disclosed hereinabove for the filtering apparatus 10. It should also be appreciated that the slotted areas 94, 96 and 104 may be provided in a wide variety of ways. That is, the slotted areas 94, 96 and 104 may be provided as shown in FIGS. 5 through 7, or in a spider-shaped arrangement as illustrated by FIG. 1, or in any other suitable shape, form or manner consistent with the purpose of the slotted areas 94, 96 and 104 as disclosed herein.

Of course, it is very desirable that the particulate 18 and 20 be retained in the vessel 12a during normal filtering operation and during backwash. Thus, the slots of the slotted areas 94, 96 and 104 are sized and shaped to prevent the particulate 18 and 20 from entering the first pipe 82 or second pipe 84.

FILTERING MODE SHOWN IN FIG. 6

With reference to FIG. 6, shown therein is the filtering apparatus 10a in normal filtering mode. As indicated by direction arrows 140, liquid to be filtered travels from the intake line 130 through the slide valve 106 and into the first pipe 82.

Since the swing check valve 98 is closed for fluid flow in this direction, the liquid passes through the slots of the slotted area 94 and into the negatively buoyant particulate 20, as indicated by direction arrows 142. Under fluid flow pressure, the liquid 52 is forced up through the vessel 12a to the positively buoyant particulate 18 (arrows 143).

Then, the liquid 52 flows under pressure through the positively buoyant particulate 18 and into the second pipe 84 by way of the slots of the slotted area 104 (direction arrows 144). Finally, filtered liquid 52 travels through the second pipe 84 (direction arrows 146) and through the slide valve 106 into the discharge line 132 (direction arrows 148).

It should be appreciated that filtering of the liquid 52 is accomplished by forcing the liquid 52 through both the negatively buoyant particulate 20 and the positively buoyant particulate 18. Further, it should be understood that at least one suitable pump and appropriate valves and controls (not shown) are provided to force the liquid 52 through the filtering apparatus 10a.

BACKWASH MODE SHOWN IN FIG. 7

Referring to FIG. 7, shown therein is the filtering apparatus 10a operating in backwash mode. Periodically, the filtering apparatus 10a should be switched to the backwash mode wherein flow through the vessel 12a is reversed in order to remove debris from the filtering apparatus 10a.

To begin the backwash process, the backwash controller 112 operates the motorized valve actuator 126 to switch the slide valve 106 to the backwash position. In the backwash position, the slide valve 106 diverts flow from the intake line 130 into the second pipe 84 (direction arrow 150) and routes flow from the first pipe 82 into the drain port 124 and a connected drain line 152 (direction arrow 154).

In backwash mode, liquid travels through the second pipe 84 (direction arrows 156) and exits the second pipe 84 through the slots of the slotted area 104. Then, the liquid passes through the positively buoyant particulate 18 to backwash debris from the positively buoyant particulate 18.

Next, the liquid 52 enters the first pipe 82 through the slots of the slotted area 94 (direction arrows 160). The reversal of flow causes the swing check valve 98 to open and the liquid 52, carrying debris loosened from the positively buoyant particulate 18, proceeds through the first pipe 82 (direction arrows 162).

As indicated by direction arrow 164, the liquid passes through the first pipe 82 without exiting through the slots of the slotted area 96. The liquid takes this path because there is far less resistance to flow through the first pipe 82 than through the slots of the slotted area 96 and into the negatively buoyant particulate 20. However, the flow of the liquid past the slotted area 96 may serve to dislodge some debris which may collect in the slots of the slotted area 96 during filtering operation.

Finally, the liquid and debris travel through the first leg 88 of the first pipe 82 (direction arrows 166), through the second port 118 and drain port 124, and into the drain line 152 (direction arrow 154). Typically, the drain line 152 is connected to a tank for collection of debris from the filtering apparatus 10a.

Switching to the backwash mode may be triggered through the backwash controller 112 by a pressure rise differential from the pressure sensors 108 and 110, or by a preset time interval through a timer of the backwash controller, or by hand operation of the valve lever 128. Return to the normal filtering mode may be initiated by the backwash controller 112 in response to a pressure drop differential from the pressure sensors 108 and 110, or by a preset time interval through the timer of the backwash controller 112, or by hand operation of the valve lever 128.

Changes may be made in the combinations, operations and arrangements of the various parts and elements described herein without departing from the spirit and scope of the invention as defined in the following claims.

What is claimed is:

1. A filtering apparatus comprising:

a vessel having an upper end and a lower end;

a volume of positively buoyant particulate disposed in the vessel;

a volume of negatively buoyant particulate disposed in the vessel;

a first tubular member extending into the vessel and having a first slotted area positioned in the volume of negatively buoyant particulate and a second slotted area positioned between the volumes of positively and negatively buoyant particulate;

a second tubular member extending into the vessel and having a slotted area positioned in the volume of positively buoyant particulate; and means for urging the liquid into the vessel through the first tubular member and out of the vessel through the second tubular member;

wherein the negatively buoyant particulate and the positively buoyant particulate filter the contaminated liquid as the liquid travels from the first tubular member to the second tubular member.

2. The filtering apparatus of claim 1 wherein the volume of positively buoyant particulate comprises a polymeric material.

3. The filtering apparatus of claim 1 wherein the volume of positively buoyant particulate comprises polymeric beads.

4. The filtering apparatus of claim 1 wherein the volume of negatively buoyant particulate comprises a material selected from the group consisting of stainless steel balls, stainless steel beads, metallic balls, metallic beads, glass beads, plastic beads, polymeric beads, filled polymeric beads, glass balls, gravel, sand, metallic balls coated with a polymeric material, metallic beads coated with a polymeric material, and polymeric beads filled with calcium.

5. The filtering apparatus of claim 1 further comprising:

a check valve located between the first and second slotted areas of the first tubular member, the check valve preventing flow through the first tubular member in the direction from the first slotted area to the second slotted area and permitting flow through the first tubular member in the direction from the second slotted area to the first slotted area.

6. The filtering apparatus of claim 1 further comprising: backwash means for reversing the flow of liquid through the vessel.

7. The filtering apparatus of claim 6 further comprising:

means for automatically reversing the flow of liquid through the vessel in response to the difference in pressure of liquid flow into the vessel and liquid flow out of the vessel.

8. The filtering apparatus of claim 6 further comprising:

means for automatically reversing the flow of liquid through the vessel in response to a selectable time interval.

9. The filtering apparatus of claim 6 further comprising:

means for manually reversing the flow of liquid through the vessel.

10. The filtering apparatus of claim 6 further comprising: means for draining liquid from the vessel while the flow of liquid through the vessel is reversed.

11. A filtering apparatus comprising:

a vessel having an upper end and a lower end;

a volume of positively buoyant particulate disposed in the vessel;

a volume of negatively buoyant particulate disposed in the vessel;

a first tubular member extending into the vessel and having a first slotted area positioned in the volume of negatively buoyant particulate and a second slotted area positioned between the volumes of positively and negatively buoyant particulate;

a second tubular member extending into the vessel and having a slotted area positioned in the volume of positively buoyant particulate; and means for urging the liquid into the vessel through the second tubular member and out of the vessel through the first tubular member;

wherein the negatively buoyant particulate and the positively buoyant particulate filter the contaminated liquid as the liquid travels from the second tubular member to the first tubular member.

12. The filtering apparatus of claim 11 wherein the volume of positively buoyant particulate comprises a polymeric material.

13. The filtering apparatus of claim 11 wherein the volume of positively buoyant particulate comprises polymeric beads.

14. The filtering apparatus of claim 11 wherein the volume of negatively buoyant particulate comprises a material selected from the group consisting of stainless steel balls, stainless steel beads, metallic balls, metallic beads, glass beads, plastic beads, polymeric beads, filled polymeric beads, glass balls, gravel, sand, metallic balls coated with a polymeric material, metallic beads coated with a polymeric material, and polymeric beads filled with calcium.

15. The filtering apparatus of claim 11 further comprising:

a check valve located between the first and second slotted areas of the first tubular member, the check valve preventing flow through the first tubular member in the direction from the second slotted area to the first slotted area and permitting flow through the first tubular member in the direction from the first slotted area to the second slotted area.

16. The filtering apparatus of claim 11 further comprising: backwash means for reversing the flow of liquid through the vessel.

17. The filtering apparatus of claim 16 further comprising:

means for automatically reversing the flow of liquid through the vessel in response to the difference in pressure of liquid flow into the vessel and liquid flow out of the vessel.

18. The filtering apparatus of claim 16 further comprising:

means for automatically reversing the flow of liquid through the vessel in response to a selectable time interval.

19. The filtering apparatus of claim 16 further comprising:

means for manually reversing the flow of liquid through the vessel.

20. The filtering apparatus of claim 16 further comprising:

means for draining liquid from the vessel while the flow of liquid through the vessel is reversed.

* * * * *

UNITED STATES PATENT AND TRADEMARK OFFICE
CERTIFICATE OF CORRECTION

PATENT NO. : 5,723,043
DATED : March 03, 1998
INVENTOR(S) : William D. Hawk, et al.

It is certified that error appears in the above-identified patent and that said Letters Patent is hereby corrected as shown below:

The title page, showing the illustrative figure, should be deleted and substitute therefor the attached title page.

Drawing sheets, consisting of Figs. 4,5 and 6, should be deleted to be replaced with the Drawing Sheet, consisting of Figs. 4,5 and 6, as shown on the attached page.

Signed and Sealed this

Twelfth Day of December, 2000

*Attest:*

Q. TODD DICKINSON

*Attesting Officer*     *Director of Patents and Trademarks*

United States Patent [19]

Hawk et al.

[11] Patent Number: 5,723,043
[45] Date of Patent: Mar. 3, 1998

[54] FILTERING APPARATUS HAVING POSITIVELY BUOYANT AND NEGATIVELY BUOYANT PARTICULATE

[76] Inventors: William D. Hawk, 7417 Aurelia Rd., Oklahoma City, Okla. 73121; Gary D. Cryer, 316 E. 15th, Chandler, Okla. 74834

[21] Appl. No.: 663,561

[22] Filed: Jun. 13, 1996

[51] Int. Cl.$^6$ .............................. A01K 63/04; C02F 3/06
[52] U.S. Cl. .................... 210/108; 210/138; 210/169; 210/275; 210/290; 210/416.2
[58] Field of Search .................................. 210/108, 138, 210/169, 275, 283, 290, 416.2

[56] References Cited

U.S. PATENT DOCUMENTS

| | | | |
|---|---|---|---|
| 1,737,202 | 11/1929 | Runnels | 210/290 |
| 3,471,025 | 10/1969 | Dobson | 210/290 |
| 3,616,915 | 11/1971 | Whitlock | 210/108 |
| 3,814,245 | 6/1974 | Hirs | 210/290 |
| 3,814,247 | 6/1974 | Hirs | 210/290 |
| 3,956,128 | 5/1976 | Turner | 210/290 |
| 4,246,119 | 1/1981 | Alldredge | 210/290 |
| 4,322,296 | 3/1982 | Fan et al. | 210/610 |
| 4,519,917 | 5/1985 | Martinola | 210/290 |
| 4,806,236 | 2/1989 | McCormack | 210/290 |
| 5,453,183 | 9/1995 | Hoffa | 210/169 |

*Primary Examiner*—Stanley S. Silverman
*Assistant Examiner*—Theodore M. Green
*Attorney, Agent, or Firm*—Dunlap & Codding, P.C.

[57] ABSTRACT

A filtration system having a volume of positively buoyant particulate material and a volume of negatively buoyant particulate material. The system includes a vessel having an upper port, a lower port and an intermediate drain port. As contaminated liquid travels between the upper and lower ports, it is filtered through both volumes of particulate material. The system may be operated with the liquid flowing in either direction between the upper and lower ports. To clean the system, the drain port is opened and cleaning liquid is pumped into the upper port and/or the lower port and flushed out the drain port. An alternate embodiment of the filtration system includes a vessel, two tubular members, a volume of positively buoyant particulate and a volume of negatively buoyant material. The two tubular members extend into the vessel and have slotted areas for travel of liquid into and out of the tubular members. A check valve, a motorized slide valve and a backwash controller are provided to automatically reverse flow through the vessel.

20 Claims, 4 Drawing Sheets

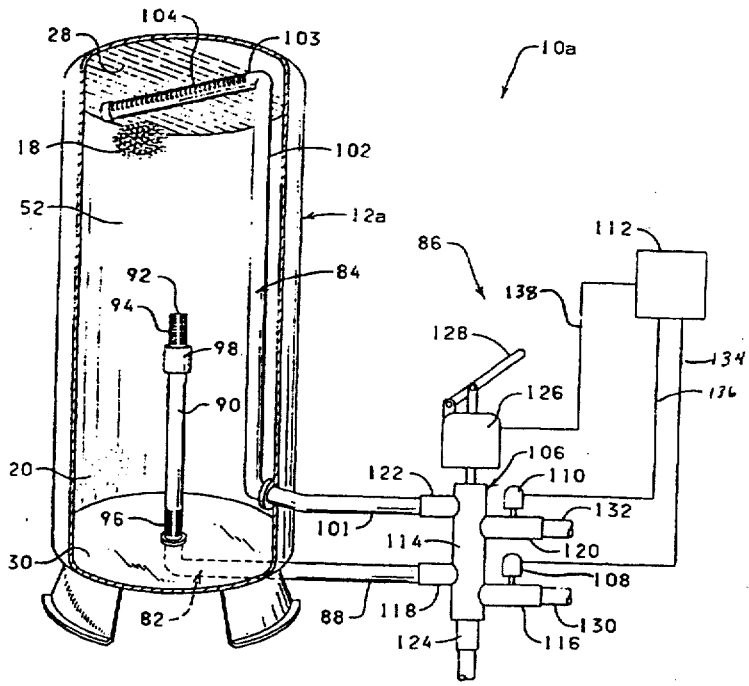

UNITED STATES PATENT AND TRADEMARK OFFICE
CERTIFICATE OF CORRECTION

PATENT NO. : 5,723,043

DATED : March 3, 1998

INVENTOR(S) : William D. HAWK et al.

It is certified that error appears in the above-identified patent and that said Letters Patent is hereby corrected as shown below:

In the Drawings:

FIG. 4, please insert the numerals ---18-- and --20-- and each associated lead line.

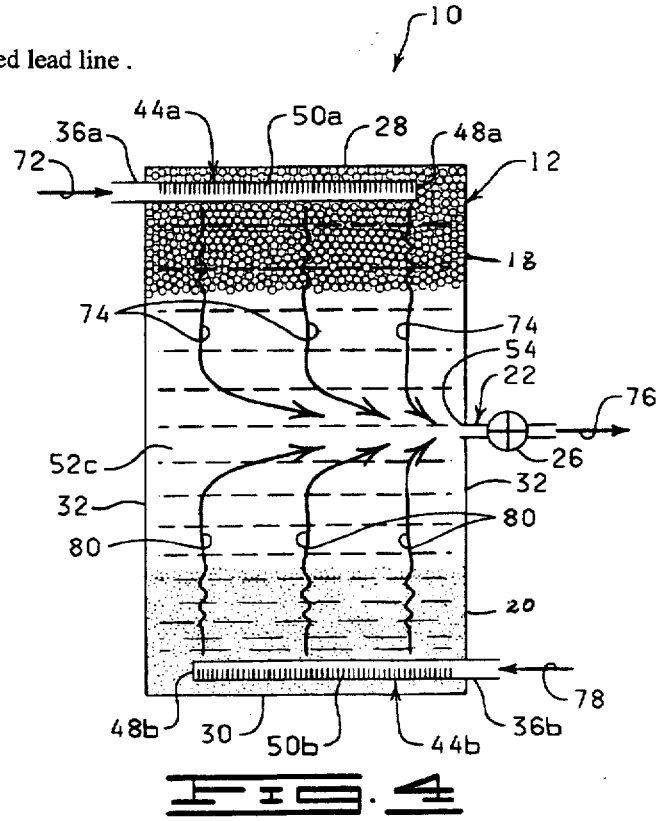

UNITED STATES PATENT AND TRADEMARK OFFICE
CERTIFICATE OF CORRECTION

PATENT NO. : 5,723,043      Page 4 of 6

DATED : March 3, 1998

INVENTOR(S) : William D. HAWK et al.

It is certified that error appears in the above-identified patent and that said Letters Patent is hereby corrected as shown below:

FIG. 5, please insert the numerals --134--,
--136--, and --138-- and each associated lead line;
and change the lead line from numeral "108",
to designate the pressure sensor and not the intake line.

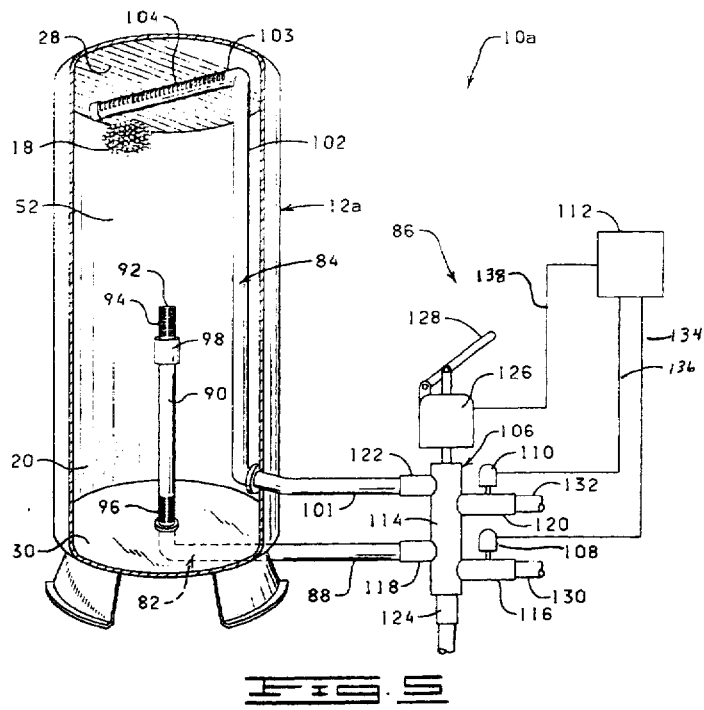

UNITED STATES PATENT AND TRADEMARK OFFICE
CERTIFICATE OF CORRECTION

PATENT NO.   :   5,723,043                                    Page 5 of 6

DATED        :   March 3, 1998

INVENTOR(S)  :   William D. HAWK et al.

It is certified that error appears in the above-identified patent and that said Letters Patent is hereby corrected as shown below:

FIG. 6, delete the numeral "142"
and substitute the numeral --143-- therefor.

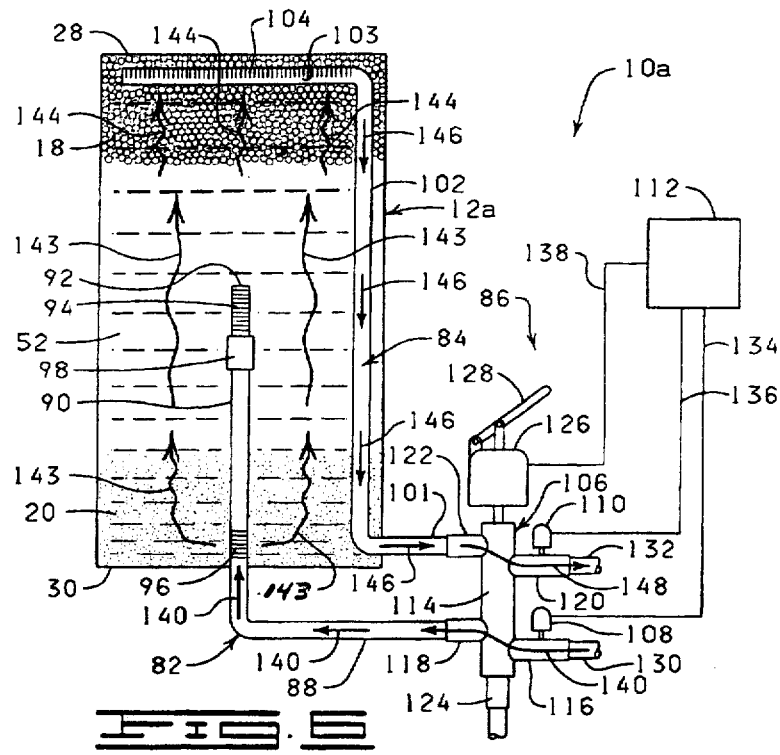

UNITED STATES PATENT AND TRADEMARK OFFICE
CERTIFICATE OF CORRECTION

PATENT NO.    :    5,723,043

DATED    :    March 3, 1998

INVENTOR(S)    :    William D. HAWK et al.

It is certified that error appears in the above-identified patent and that said Letters Patent is hereby corrected as shown below:

Col. 6:  line 29, delete "vessel 10" and substitute therefor ---vessel 12--;

line 52, delete "first leg 88" and substitute therefor ---second leg 90--;

Col. 7:  line 2, after "actuator 126," and before "and" insert --electrically connected to the backwash controller 112 by a control line 138,--;

Col. 8:  line 18, delete "arrows" and substitute therefor --arrow--;

line 43, delete "particulate 18." and substitute --particulate 18 (direction arrows 158).-- therefor;

Col. 9:  line 27 (line 15 of claim 1), delete "the liquid" and substitute --a contaminated liquid -- therefor; and Col. 10:  line 20 (line 15 of claim 11), delete "the liquid" and substitute --a contaminated liquid-- therefor.